(12) United States Patent
Arno et al.

(10) Patent No.: US 7,320,725 B2
(45) Date of Patent: Jan. 22, 2008

(54) DISPOSABLE CARTRIDGE AIR/GAS DRYER

(75) Inventors: Michael J. Arno, Clarence, NY (US); Daniel Blaszkowiak, Cheektowaga, NY (US)

(73) Assignee: Illinois Tool Works Inc., Glenview, IL (US)

( * ) Notice: Subject to any disclaimer, the term of this patent is extended or adjusted under 35 U.S.C. 154(b) by 230 days.

(21) Appl. No.: 11/084,852

(22) Filed: Mar. 18, 2005

(65) Prior Publication Data

US 2005/0268785 A1   Dec. 8, 2005

Related U.S. Application Data

(60) Provisional application No. 60/554,561, filed on Mar. 19, 2004.

(51) Int. Cl.
*B01D 53/04* (2006.01)
*B01D 53/26* (2006.01)

(52) U.S. Cl. .......................... 96/117.5; 96/135; 96/138; 96/147; 55/320; 55/357; 55/433; 55/462; 55/515; 55/DIG. 17

(58) Field of Classification Search ............... 96/117.5, 96/134, 135, 137, 138, 147, 149, 151, 152; 55/320, 332, 356, 357, 413, 433, 462, 515, 55/DIG. 17; 210/282
See application file for complete search history.

(56) References Cited

U.S. PATENT DOCUMENTS

| | | |
|---|---|---|
| 1,190,221 A | 7/1916 | Daugherty |
| 1,681,531 A | 8/1928 | Gannon |
| 1,750,632 A | 3/1930 | Farmer |
| 1,839,350 A | 1/1932 | Slagel |
| 1,866,659 A | 7/1932 | Litle, Jr. |
| 2,199,258 A | 4/1940 | Gray ........................ 210/131 |

(Continued)

FOREIGN PATENT DOCUMENTS

EP   0042683 A1   12/1981

(Continued)

OTHER PUBLICATIONS

Viskon-Aire, Camair TS-10 Desiccant Air Dryer, Nov. 1992, 2 pages.

*Primary Examiner*—Frank M. Lawrence
(74) *Attorney, Agent, or Firm*—Schwartz & Weinrieb (57) ABSTRACT

A disposable cartridge air/gas dryer apparatus for installation in an air/gas line delivering compressed air or gas to an air/gas-driven tool. The dryer includes a pressure vessel having first and second ends, an inlet port, and an outlet port. A disposable dryer cartridge is disposed in the pressure vessel. The cartridge includes a casing and a quantity of a drying composition in the casing. A cartridge support surface in the pressure vessel supports a first end of the cartridge. A cartridge-receiving opening is provided in the pressure vessel for inserting and removing the cartridge in the pressure vessel. A cover removably covers the opening and captures a second end of the cartridge. The dryer can be provided with a handle so that it can be easily and quickly replaced by opening the cover, pulling out the cartridge and inserting a new cartridge. To simplify the cover construction, the pressure vessel outlet port can be positioned in adjacent opposition to a side portion of the cartridge, so that the cover thus does not require any air/gas passages.

20 Claims, 6 Drawing Sheets

U.S. PATENT DOCUMENTS

| | | | |
|---|---|---|---|
| 2,214,925 A | 9/1940 | Gutrie | 252/2 |
| 2,273,779 A | 2/1942 | Dickey et al. | 183/75 |
| 2,325,657 A | 8/1943 | Burkness | 210/134 |
| 2,526,782 A | 10/1950 | Thorpe | 183/45 |
| 2,526,938 A | 10/1950 | Davis et al. | 252/408 |
| 2,536,274 A | 1/1951 | Gaugler | 210/131 |
| 2,554,879 A | 5/1951 | Race, Jr. | 183/4.8 |
| 2,558,125 A | 6/1951 | Cullen | 55/433 |
| 2,579,053 A | 12/1951 | Schulstadt | 210/131 |
| 2,593,132 A | 4/1952 | Gannon | 183/4.8 |
| 2,649,923 A | 8/1953 | Woppman | 183/4.8 |
| 2,671,526 A | 3/1954 | Hunt et al. | 183/4.8 |
| 2,671,528 A | 3/1954 | Gross | 183/49 |
| 2,751,999 A | 6/1956 | Semon | 55/513 |
| 2,845,138 A | 7/1958 | Gageby | 183/4.8 |
| 2,987,175 A | 6/1961 | Bottum | 206/46 |
| 3,008,540 A | 11/1961 | Gibson, Jr. | 96/121 |
| 3,029,581 A | 4/1962 | Robbins | 55/316 |
| 3,047,993 A | 8/1962 | Robbins | 55/274 |
| 3,090,490 A | 5/1963 | Yocum | 210/299 |
| 3,169,112 A | 2/1965 | Nelson | 210/266 |
| 3,203,551 A | 8/1965 | Van Loan, Jr. | |
| 3,209,917 A | 10/1965 | Yelinek | 210/484 |
| 3,240,567 A | 3/1966 | Caparreli et al. | 23/284 |
| 3,246,758 A | 4/1966 | Wagner | 210/94 |
| 3,358,428 A | 12/1967 | Mann | 55/387 |
| 3,410,061 A | 11/1968 | Knight | |
| 3,415,041 A | 12/1968 | Kraissl, Jr. | 55/342 |
| 3,464,186 A | 9/1969 | Hankison et al. | 55/163 |
| 3,479,146 A | 11/1969 | Hochman et al. | 23/288 |
| 3,559,381 A | 2/1971 | Fesco | |
| 3,678,662 A | 7/1972 | Grote | |
| 3,681,899 A | 8/1972 | Grote | 55/503 |
| 3,705,480 A | 12/1972 | Wireman | 55/275 |
| 3,724,177 A | 4/1973 | Grote | 55/316 |
| 3,941,573 A | 3/1976 | Chapel | 55/316 |
| 4,015,959 A | 4/1977 | Grote | |
| 4,032,307 A | 6/1977 | Sommerfeld | |
| 4,177,049 A | 12/1979 | Haslett, Jr. | 55/483 |
| 4,478,619 A | 10/1984 | Arends et al. | |
| 4,548,624 A | 10/1985 | Waller | 55/274 |
| 4,572,725 A * | 2/1986 | Kojima | 96/137 |
| 4,600,416 A | 7/1986 | Mann | |
| 4,612,026 A | 9/1986 | Pollara et al. | 96/117.5 |
| 4,705,543 A | 11/1987 | Kertzman | 96/6 |
| 4,741,697 A | 5/1988 | Herbison | 433/25 |
| 4,746,338 A | 5/1988 | Williams | 55/275 |
| 4,770,678 A | 9/1988 | Haslett, Jr. | 55/179 |
| 4,811,571 A | 3/1989 | Mayer | 62/474 |
| 4,822,387 A | 4/1989 | Daniels | 55/323 |
| 4,828,589 A * | 5/1989 | Bauer et al. | 96/109 |
| 5,110,330 A | 5/1992 | Loughran | 55/275 |
| 5,215,660 A | 6/1993 | Mosher et al. | |
| 5,240,483 A | 8/1993 | Rosen | 96/137 |
| 5,350,442 A | 9/1994 | Thelen et al. | 95/115 |
| 5,427,609 A | 6/1995 | Zoglman et al. | 95/98 |
| 5,580,451 A | 12/1996 | Tack | 210/266 |
| 5,630,855 A | 5/1997 | Lundbäck | 96/405 |
| 5,667,566 A | 9/1997 | Flynn et al. | 96/138 |
| 5,681,370 A | 10/1997 | McMahon | 95/105 |
| 5,683,499 A | 11/1997 | Kiyani | 96/147 |
| 5,746,807 A | 5/1998 | Thelen et al. | 95/123 |
| 5,846,271 A | 12/1998 | Flynn et al. | 55/315 |
| 6,071,322 A | 6/2000 | Hulthen | |
| 6,106,596 A | 8/2000 | Haramoto et al. | |
| 6,309,450 B1 | 10/2001 | Millen et al. | 96/131 |
| 6,402,811 B1 | 6/2002 | Shanks et al. | 95/90 |
| 6,585,173 B2 | 7/2003 | Schmon et al. | 239/526 |
| 6,786,947 B2 | 9/2004 | Mountford | |
| 6,835,234 B2 | 12/2004 | Leffel et al. | 96/108 |
| 6,966,935 B1 * | 11/2005 | Neighbors et al. | 55/385.1 |
| 2005/0132887 A1 | 6/2005 | Mitsch et al. | 96/108 |

FOREIGN PATENT DOCUMENTS

| | | |
|---|---|---|
| JP | 54-46185 A | 4/1979 |
| WO | WO 2005089221 | 9/2005 |

* cited by examiner

DISPOSABLE CARTRIDGE AIR/GAS DRYER

CROSS-REFERENCE TO RELATED APPLICATIONS

This application claims benefit of the filing date of U.S. Provisional Application Ser. No. 60/554,561 filed on Mar. 19, 2004.

This application also relates to co-pending application Ser. No. 11/084,843, filed on even date herewith and entitled "Disposable Cartridge Air/Gas Dryer", the contents of which are fully incorporated herein by this reference.

BACKGROUND OF THE INVENTION

1. Field of the Invention

The present invention relates to the field of compressed air and gas systems, and more particularly to filtering and drying equipment for filtering and removing moisture from compressed air and gas delivered to air/gas-driven tools.

2. Description of Prior Art

Typical compressed air or gas produced by a compressor apparatus is saturated with 50% to 100% relative humidity, and also contains contaminants such as dirt, dust, oil, line debris and other matter. Filters and traps remove liquid water and other contaminants but do nothing to eliminate the 50% to 100% moisture vapor introduced by compressors, air lines, fittings, regulators and other equipment. This can cause problems in applications such as paint booth operations where compressed air or gas is used as a propellant to atomize and expel paint from a paint gun. If moisture-laden ambient air is delivered through the air/gas line, it will feed through the paint gun, and may cause unwanted fouling that results in a bad and unacceptable paint job.

The removal of this moisture vapor requires that an air/gas dryer system be used, such as a refrigerated dryer or an adsorbent type of dryer. Such systems are generally very effective, the latter being typically capable of drying compressed air or gas to below-zero dew point levels. There are several types of adsorbent dryers available for different applications. Large centralized adsorbent dryers are used in factories and other environments where compressed air/gas must be delivered to multiple points-of-use, such as a group of assembly line workers operating air tools. Such dryers are large complicated devices that are intended to be serviced by experienced technicians, as when the adsorbent therein is spent and needs to be replaced. At the other end of the spectrum, disposable point-of-use adsorbent dryers are available that can be connected between the end of an air/gas line and an air/gas tool (such as a paint gun). These simple devices are intended to be disposed of after a relatively small number of applications (e.g., painting several cars), when the modest amount of adsorbent material therein will usually be spent. Occupying a middle ground of the adsorbent dryer spectrum are various near point-of-use dryers adapted for in-line placement within approximately 10-20 feet (or less) of a point-of-use. For example, a commercial paint booth will often have a small adsorbent dryer mounted on the wall of the booth. These systems typically comprise adsorbent-containing canisters in which are disposed a quantity of desiccant or other adsorbent, or a removable cartridge containing such material. The inlet side of the canister receives moist air/gas from a compressed air/gas source while the canister's outlet side delivers dry air/gas to a short air/gas hose that the user connects to a point-of-use tool. In most such systems, the canister is a generally hollow cylinder that is approximately one foot in height and approximately six inches in diameter. Other sizes are also available, depending on drying capacity requirements.

A disadvantage of the above-described near point-of-use adsorbent dryer systems is that the removal and replacement of adsorbent requires disassembly of the canister or cartridge and the removal of the loose granular adsorbent therefrom for recycling, followed by the reintroduction of fresh adsorbent. This procedure can be messy, time consuming, and wasteful of adsorbent insofar as it is almost always the case that some of the adsorbent will spill out, scatter and become lost during the removal and recharging process. If a cartridge is involved, it needs to be disconnected from cartridge carrying components within the dryer and then reconnected thereto following recharging. As a result, personnel who use compressed air/gas tools typically do not want to be bothered with the task of replenishing these systems with new adsorbent when the old material is spent, and thus may continue to use them even after their moisture vapor removal capabilities are no longer optimal. Such personnel may adopt a "let the next guy do it" attitude when in comes to properly servicing and maintaining these systems.

A further consideration that must be taken into account when using a near point-of-use adsorbent drying system is the need to employ adequate means to ensure that any water'slugs in the compressed air/gas are separated and drained off before reaching the adsorbent. Contaminants such as compressor debris, oil, dirt, and the like also need to be filtered, typically down to approximately 0.1 micron or below. In conventional near point-of-use adsorbent dryer systems, separate coalescer and filter canisters are typically placed next to the adsorbent-containing canister to perform these functions. Each of these will have its own filter element that must be periodically removed and replaced. There also needs to be a means to filter out adsorbent "dust" before the dried air/gas is exited from the dryer for use in an application. Conventional near point-of-use adsorbent dryers provide an additional filter for this purpose, and this filter must also be periodically serviced.

It is to solving the foregoing problems that the present invention is directed. What is needed is an improved air/gas dryer for near point-of-use operation that is easy to install and use, and simple to maintain. The dryer should be suitable for use as the primary or sole air/gas moisture vapor treatment apparatus in a compressed air/gas system that serves a small number of users. The system should be capable of reducing moisture vapor content in a compressed air/gas stream down to a relative humidity of less than ½% (−40 degrees F. dew point). This means the no moisture will condense into liquid water until the compressed air/gas sees a temperature of −40 degrees F. below zero. Adding filtering and coalescing functions to such a dryer would be further desirable. It would be further desirable for such a system to have a 'visual' indication identifying the exact state of dryness. Constructing the system to be portable would be an additional advantageous feature.

SUMMARY OF THE INVENTION

The foregoing problems are solved and an advance in the art is achieved by a disposable cartridge air/gas dryer apparatus for near point-of-use installation in an air/gas line delivering compressed air or gas to an air/gas-driven tool. The dryer includes a pressure vessel having an inlet port and an outlet port. A disposable dryer cartridge is situated in the pressure vessel. The cartridge includes a casing and a quantity of a drying composition in the casing. A cartridge support surface in the pressure vessel supports a first end of the cartridge. A cartridge-receiving opening is provided in the pressure vessel for inserting and removing the cartridge in the pressure vessel. A cover removably covers the opening and captures a second end of the cartridge. The dryer can be provided with a handle so that it can be easily and quickly replaced by opening the cover, pulling out the cartridge and inserting a new cartridge. To simplify the cover construction, the pressure vessel outlet port can be positioned in adjacent opposition to a side portion of the cartridge. This eliminates the need to provide air/gas passages in the cover.

In exemplary embodiments of the invention, the cartridge can be constructed as a flexible sack-like casing made from a fabric that performs a filtering function. Alternatively, the cartridge can be constructed as a rigid casing having apertured end caps and filter media disposed in each end cap. The drying composition in the cartridge may comprise a moisture adsorbing desiccant, or other suitable material. The cartridge support surface may comprise a coalescer assembly that includes a rigid plate on which the cartridge rests, an aperture in the plate to allow air/gas flow into the cartridge, and a coalescing baffle extending from the plate into an air/gas flow path to capture liquid particulates. The pressure vessel may further include a sump area below the coalescer assembly for trapping liquid particulates received from the baffle and a drain port for draining the sump area. Thus, the dryer may perform filtering and coalescing functions in addition to its drying function. The inlet port and the outlet port on the pressure vessel can be respectively situated proximate to first and second ends of the cartridge, with the inlet port being disposed below the coalescer assembly and the outlet port being disposed below the cover. An optional floor stand can be provided on the pressure vessel so support the dryer on the floor of a work area. Alternatively, a wall mount can be provided on the pressure vessel to support the dryer on the wall of a work area. A dryness indicator can be provided on the pressure vessel proximate to the cartridge-receiving opening.

BRIEF DESCRIPTION OF THE DRAWINGS

The foregoing and other features and advantages of the invention will be apparent from the following more particular description of preferred embodiments of the invention, as illustrated in the accompanying Drawings in which.

DETAILED DESCRIPTION OF EXEMPLARY EMBODIMENTS

Figure 1:
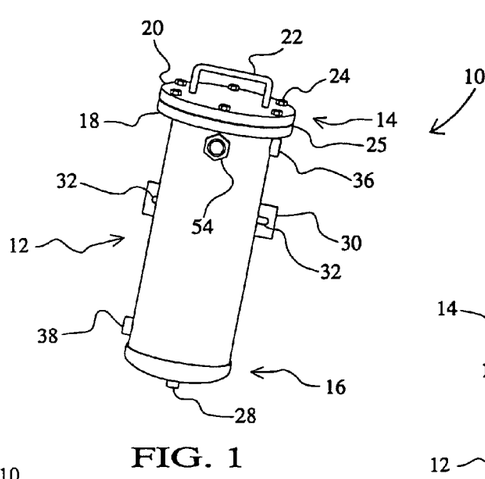
FIG. 1 is a perspective view showing a disposable cartridge air/gas dryer constructed in accordance with the present invention in which the dryer is adapted for wall mounting.
Figure 2:
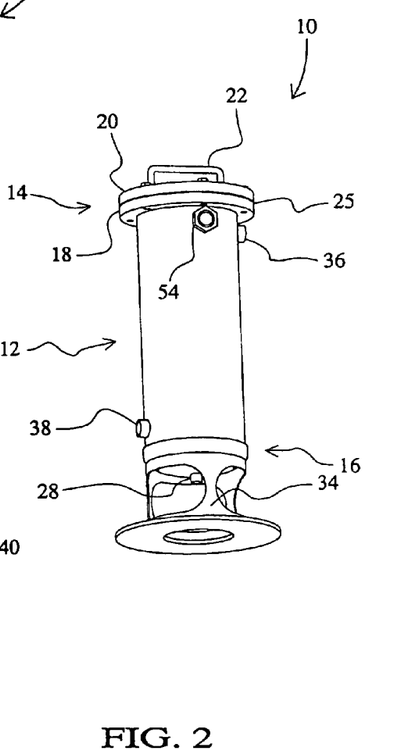
FIG. 2 is a perspective view showing the dryer of FIG. 1 in which the dryer is adapted to be supported on a floor or other surface.
Figure 3:
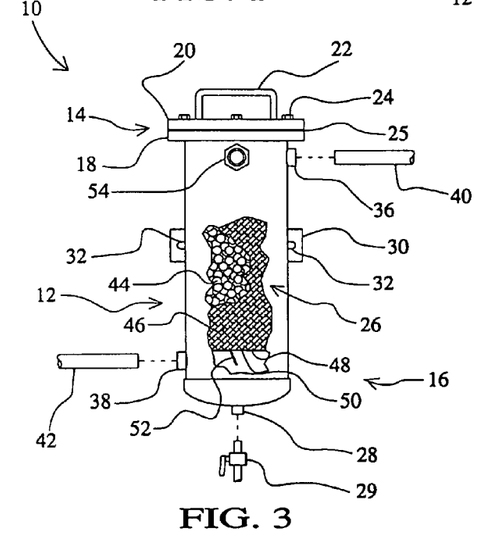
FIG. 3 is a side elevation view of the dryer of FIG. 1 connected to an inlet line, an outlet line, and a drain valve, and having a side portion thereof broken away to illustrate a disposable dryer cartridge within the dryer.

Turning now to the drawings wherein like reference numerals indicate like elements in all of the several views, FIGS. 1-3 illustrate a disposable cartridge air/gas dryer apparatus 10 adapted for near point-of-use installation in an air/gas line delivering compressed air or gas to an air/gas-driven tool. Unless otherwise indicated herein, all structural components are assumed to fabricated from aluminum, steel or other suitable material capable of withstanding the operating pressures associated with the intended air/gas application for which the dryer 10 will be used. The dryer 10 comprises a main pressure vessel 12 having a first (upper) end 14 and a second (lower) end 16. Although not shown in FIGS. 1-3, the upper end 14 of the dryer 10 has a large central opening that provides access to the hollow interior of the pressure vessel 12. Surrounding this opening is a circumferential mounting flange 18 that is adapted to receive a cover plate 20 having a handle 22. Six fasteners 24 are used to retain the cover plate 20 to the mounting flange 18. A seal 25 (best shown in FIG. 6) is disposed between the cover plate 20 and the mounting flange 18 to ensure that pressure integrity is maintained within the dryer 10 during operation. Removal of the fasteners 24 and the cover plate 20 allows access to the interior of the pressure vessel 12, which is substantially hollow in order to receive a dryer cartridge 26, as shown in FIG. 3. It will be appreciated that the cover plate 20 could be secured to the mounting flange 18 using other techniques, such as by threaded engagement. In that configuration, the fasteners 24 would not be required. The seal 25 could also be changed from a flat seal to an o-ring seal and seated in a circumferential seal groove formed in the cover plate 20, the mounting flange 18, or both.

The lower end 16 of the pressure vessel 12 defines a sump area that drains to a drain port 28 for removing liquid from the interior of the pressure vessel following the removal of liquid particulates from an air/gas stream. As shown in FIG. 3, a conventional ball valve 29 is mounted to the drain port 28 for releasing the collected liquid when required.

FIGS. 1 and 2 illustrate two alternative mounting schemes that may be used to support the dryer 10 at an installation location. In FIG. 1, a mounting bracket assembly 30 having two mounting holes 32 is formed on or attached to the pressure vessel 12 This configuration allows the dryer 10 to be mounted to a wall or other structure (not shown) near a point of use (e.g., the wall of a paint booth). In FIG. 2, a stand 34 is formed on or attached to the lower end 16 of the pressure vessel. This configuration allows the dryer 10 to be supported on a floor or other surface (not shown) near a point of use (e.g., the floor of a paint booth). The handle 22 associated with the cover plate 20 may be used to pick up the dryer, 10 and move it from one location to another. Thus, FIG. 2 may be thought of as illustrating a portable configuration for the dryer 10 while FIG. 1 illustrates a fixed mounted configuration.

As further shown in FIGS. 1-3, the pressure vessel 12 additionally comprises two air/gas ports 36 and 38 for installing the dryer 10 in a compressed air/gas line. As shown in FIG. 3, the port 36 is disposed proximate to the upper end 14 of the pressure vessel 12, and functions as an outlet port that is adapted to connect to an outlet line 40. The port 38 is disposed proximate to the lower end 16 of the pressure vessel 12, and functions as an inlet port that is adapted to connect to an inlet line 42. During dryer operation, the flow of air/gas through the dryer 10 begins at the lower inlet port 38, passes upwardly through the cartridge 26, and then exits through the outlet port 36. The dryer 10 is suited for installation near a point-of-use, such as upstream of an air/gas-driven tool (not shown) that is connected to the outlet line 40, and downstream of a compressed air/gas source (not shown) supplying compressed air or gas via the inlet line 42. If desired, a filter and trap system (not shown) could be connected to the inlet line 38 immediately upstream of the inlet line 42. However, as described in more detail below, the dryer 10 has the ability to perform filtering and coalescing functions that may obviate the need for additional filters or traps.

The cartridge 26 as shown in FIG. 3 comprises a quantity of a drying composition 44 disposed within a sack-like fabric casing 46. The drying composition 44 comprises a medium that dries the compressed air/gas stream passing through the dryer 10. The cartridge 26 is sized so as to fill up a substantial portion of the pressure vessel 12. Advantageously, no connections are needed to mount or secure the cartridge 26 in the dryer 10. The upper end of the cartridge 26 is disposed proximate to the opening in the upper end 14 of the pressure vessel 12, and is captured by the cover plate 20. The bottom end of the cartridge 26 is disposed proximate to the lower end 16 of the pressure vessel 12 and rests on a liquid coalescer assembly 48. The coalescer assembly 48 is constructed as a plate mounted slightly above the inlet port 38 (toward the outlet port 36) and provides a rigid, substantially planar cartridge support surface that engages a major portion of the bottom end of the cartridge 26. The coalescer assembly 48 also includes a central aperture 50 to pass air/gas flow into the cartridge 26, and an angled baffle 52 extending below the aperture 50. The baffle 52 removes liquid particulates from the air/gas stream, before the particulates can reach the drying composition 44 in the cartridge 26.

The final component of the dryer 10 shown in FIGS. 1-3 is a dryness indicator 54 situated on the pressure vessel 12 proximate to the outlet port 36. The dryness indicator 54 is conventional in nature and comprises a site glass unit that is threadably mounted in an aperture extending through the pressure vessel wall. Disposed within the dryness indicator 54 is a dryness-indicating material, such as a moisture sensitive paper or a quantity of color-changing desiccant.

Figure 4:
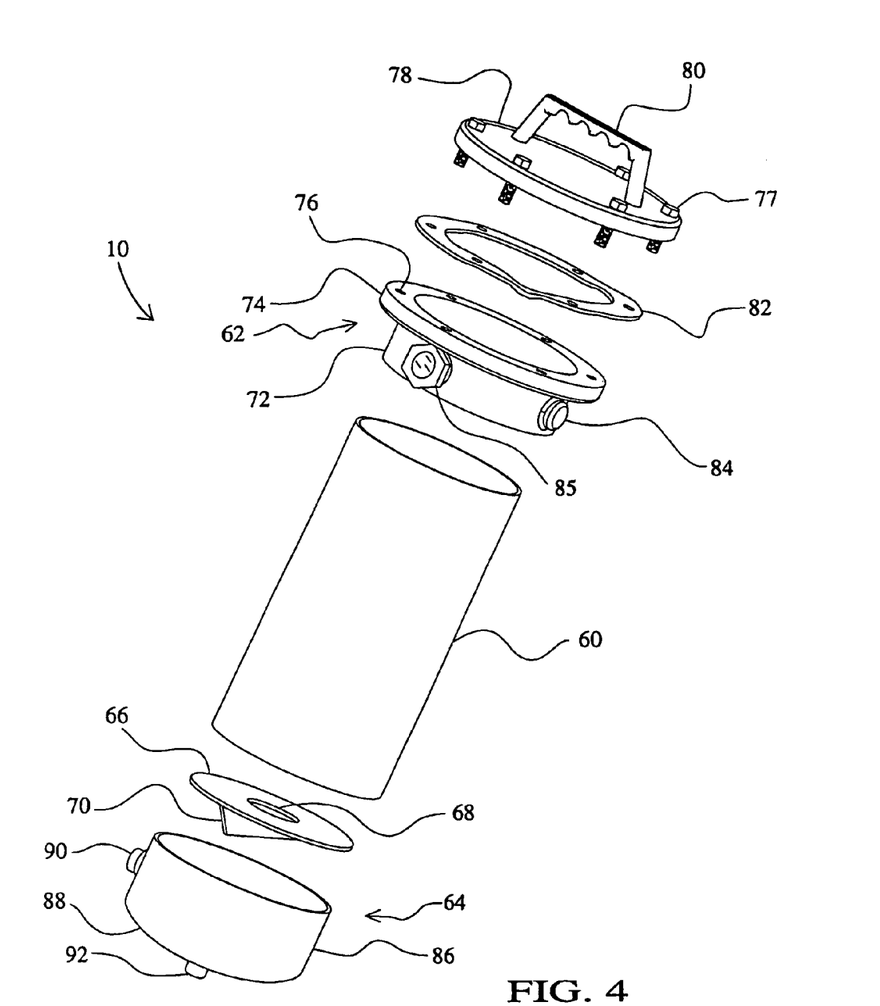
FIG. 4 is an exploded perspective view of an exemplary construction of the dryer of FIGS. 1-3.

Turning now to FIG. 4, an exemplary construction of the dryer 10 is shown by way of example only, and not by way of limitation, in which the pressure vessel 12 of FIGS. 1-3 is fabricated from discrete components that are welded together. The illustrated components include a tubular shell member 60 that provides the main body portion of the pressure vessel 12, an upper flange casting 62 that provides the pressure vessel upper end 14, and a lower sump casting 64 that provides the pressure vessel lower end 16. A flat disk member 66 with a central aperture 68 and an angled baffle 70 provides the liquid coalescer assembly 48 of FIGS. 1-3. To fabricate the pressure vessel 12, the upper flange casting 62 is welded to one end of the tubular shell member 60. In a separate step, the disk member 66 is formed with its aperture 68 and the baffle 70 is welded to the underside of the disk member at the desired angle. The completed assembly comprising elements 66, 68 and 70 is then welded to the remaining end of the tubular shell member 60. At this point, the lower sump casting 64 is welded to the same end of the tubular shell member 60.

The upper flange casting 62 includes a tubular base portion 72 whose lower end is adapted to be welded to the upper end of the tubular shell member 60. To facilitate an air tight connection, the inside diameter of the tubular base portion 72 substantially matches the outside diameter of the tubular shell member 60 while allowing the lower end of the tubular base portion to slide into overlapping engagement with the upper end of the tubular shell member. A circumferential flange 74 is formed on the flange casting 62 and provides the mounting flange 18 of FIGS. 1-3. The flange 74 is formed with a set of threaded holes 76 that are adapted to receive six bolts 77 that provide the fasteners 24 of FIGS. 1-3. A cover casting 78 having an integral handle 80 provides the cover 20 and the handle 22 of FIGS. 1-3. A resilient flat gasket 82 is disposed between the flange 74 and the cover casting 78 to provide the seal member 25 of FIGS. 1-3. A conventional air/gas line fitting 84 is threaded into a tapped hole formed in the upper flange casting's tubular base portion 72 to provide the outlet port 36 of FIGS. 1-3. A site glass fitting 85 is threaded into a second tapped hole formed in the tubular base portion 72 to provide the dryness indicator 54 of FIGS. 1-3.

The lower sump casting 64 includes a tubular side portion 86 whose upper end is adapted to be welded to the lower end of the tubular shell member 60. To facilitate an air tight connection, the inside diameter of the tubular side portion 86 substantially matches the outside diameter of the tubular shell member 60 while allowing the upper end of the tubular side portion to slide into overlapping engagement with the lower end of the tubular shell member. The lower sump casting 64 further includes a rounded bottom portion 88 that is substantially closed. A conventional air/gas line fitting 90 is threaded into a tapped hole formed in the lower sump casting's side portion 86 to provide the inlet port 38 of FIGS. 1-3. Another conventional air/gas fitting 92 is threaded into a second tapped hole that is centrally formed in the lower sump casting's bottom portion 88 to provide the drain outlet 28 of FIGS. 1-3.

Figure 5:
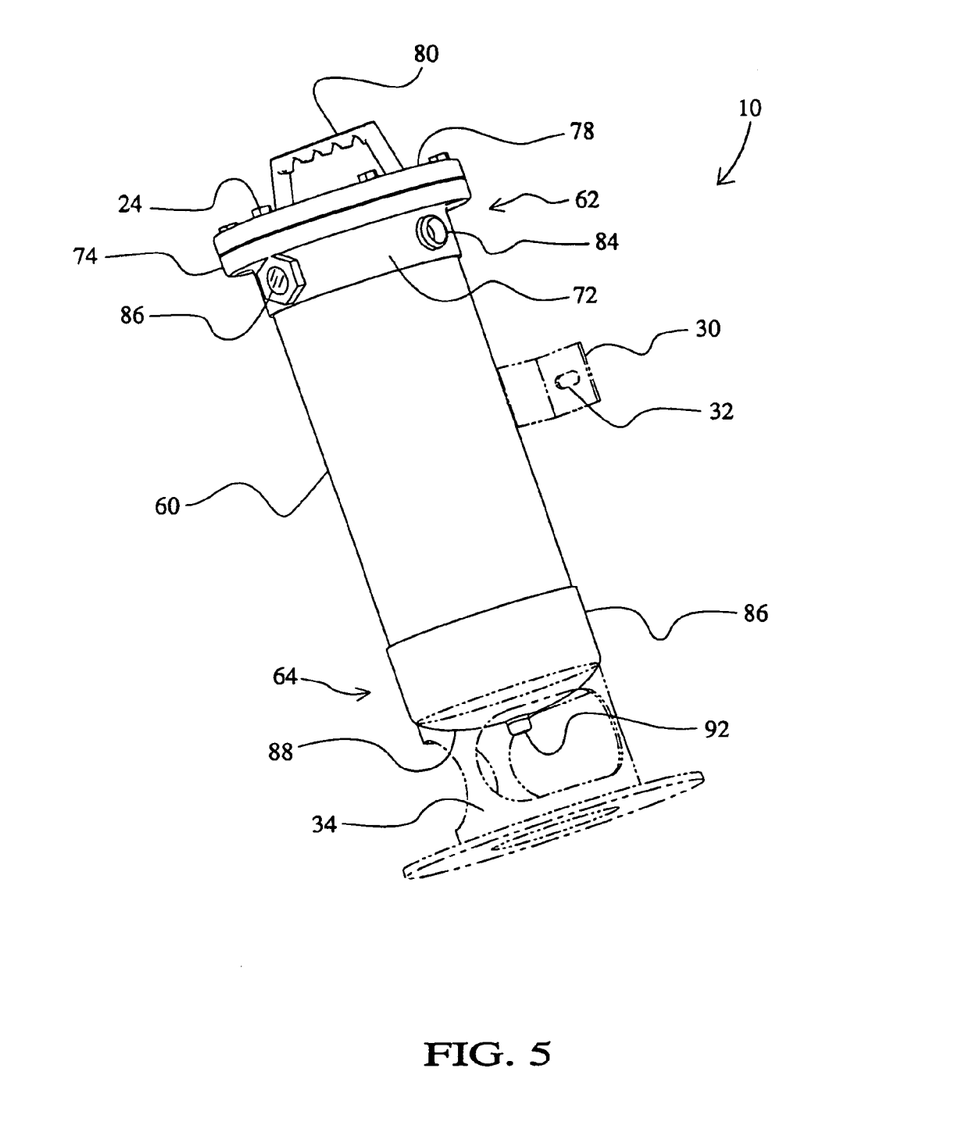
FIG. 5 is a perspective view showing the construction of FIG. 4 following fabrication.

FIG. 5 shows a completed dryer 10 following assembly of the components of FIG. 4 according to the fabrication steps outlined above. FIG. 5 also illustrates the alternative use of the mounting bracket assembly 30 attached to the tubular shell member 60, and the stand 34 attached to the lower sump casting 64. These components can be affixed to the dryer 10 by welding or any other suitable fabrication technique.

Figure 6:
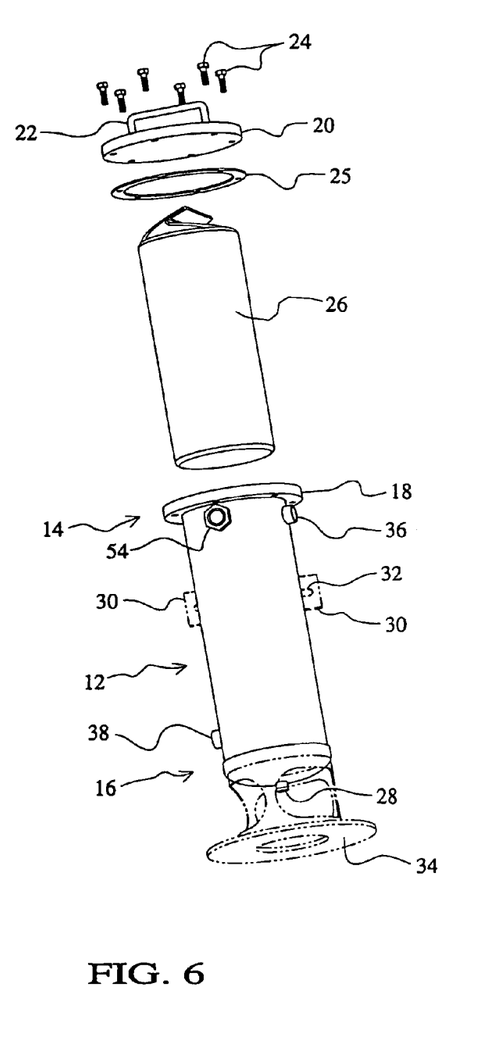
FIG. 6 is an exploded perspective view showing the dryer of FIGS. 1-3 and the disposable dryer cartridge therein.
Figure 7:
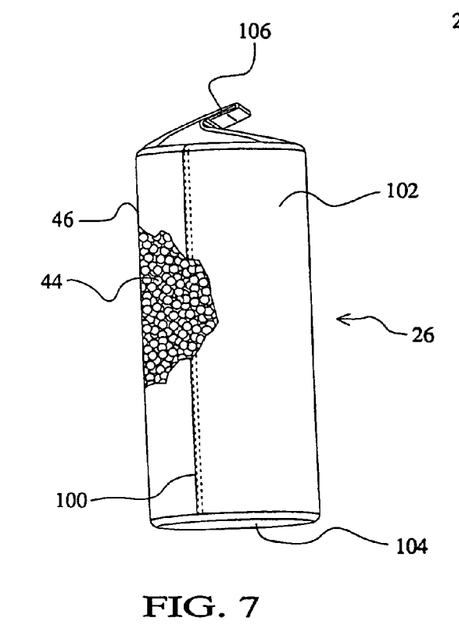
FIG. 7 is an enlarged perspective view showing the disposable dryer cartridge of FIG. 6.

Turning now to FIGS. 6 and 7, the dryer 10 as represented in FIGS. 1-3 is shown in an exploded view format in order to better illustrate the disposable cartridge 26 and its positioning in the pressure vessel 12. As previously described, the cartridge 26 comprises a quantity of a drying composition 44 disposed within a sack-like fabric casing 46. The drying composition 44 can be selected from any suitable material having the required drying characteristics, including but not limited to (1) moisture adsorbing desiccants such as activated alumina beads, silica gel beads, clays and molecular sieves, and (2) moisture absorbing fibers such as cotton, paper, wood particles or the like. Due to their superior moisture removal properties, activated alumina desiccant beads of the type commonly used in compressed air/gas drying systems represent the preferred material used for the drying composition 44. The size of the desiccant beads is selected to minimize unwanted pressure drop within the dryer 10 while providing adequate drying characteristics.

The average desiccant bead diameter will preferably lie in a range of about 0.1-0.4 inches.

It will be appreciated that increasing the diameter of the desiccant beads tends to reduce the resistance to air/gas flow through the dryer 10, thereby reducing pressure drop, but also reduces the amount of effective adsorbing surface area. On the other hand, decreasing the size of the desiccant beads increases the amount of adsorbing surface area, but also increases the resistance to air/gas flow, so as to increase the pressure drop through the dryer 10. Assuming the drying composition 44 consists of 0.1-0.4 inch activated alumina desiccant beads, and is carried within a casing 46 whose operational diameter is approximately 5-6 inches and whose length is approximately 12-15 inches, the cartridge 26 should be capable of delivering a relative humidity of as low as ½% (−40 degree F. dew point) at a flow rate of 30 SCFM (Standard Cubic Feet per Minute), with an inlet pressure of 100 psi and an outlet pressure of 90-95 psi. Also, with the casing 46 being this size, the cartridge 26 should be able to hold an exceptional charge that would be sufficient, for example, to paint up to 30-50 automobiles (if the dryer 10 is used in paint both) before needing to be replaced.

As described in more detail in copening Application Ser. No. 11/084,843, whose contents are incorporated herein, the casing 46 can be formed from many different materials. One such material is a non-woven fabric sold by Kimberly-Clark Corporation of Roswell, Ga. under the trade name Evolution® Series Filtration Media. The Evolution® material is described as being a filtering fabric comprising plural meltblown polypropylene sheets that are thermally bonded together. Preferably, the fabric material that forms the casing 46 will have a porosity that is small enough to provide an air/gas filtering function. For example, a pore size of 0.1 microns would enable the casing 46 to effectively filter out dirt, dust, oil residue, and other debris to approximately 0.1 microns or below (e.g., down to approximately 0.01 microns). It will be seen that the casing 46 has a generally tubular configuration to match the generally tubular shape of the pressure vessel 12. Other casing configurations could also be used, depending on the shape of the pressure vessel 12. Indeed, as a general rule, the cross-sectional configuration of the casing 46 needs to closely match the cross-sectional configuration of the pressure vessel 12, it being necessary for successful operation of the dryer 10 that substantially all of the compressed air/gas flowing from the inlet port 38 to the outlet port 36 be required to pass through the cartridge 26. Otherwise, if the cartridge 26 does not fill the cross-sectional area of the pressure vessel 12, air/gas could flow between the cartridge and the inside wall of the pressure vessel, thereby decreasing the dryer's efficiency.

The material used to form the casing 46 can be configured into the required shape by sewing or otherwise joining patterned sheets of the material (e.g., by gluing, heat sealing, etc.). Reference numeral 100 in FIG. 7 illustrates a longitudinal seam that results from a joining operation used to form a main cylindrical portion 102 of the casing 46. An additional circumferential seam at the bottom of the casing 46 results from a joining operation that forms a generally flat bottom wall 104 of the casing 46 that is adapted to rest on the coalescer assembly 48. Once the casing's tubular portion 102 and bottom wall 104 are formed, the drying As described in more detail in copending application Ser. No. 11/084,843, a mold (not shown) may be used to support the casing 46 and gauge the amount of the drying composition 44 added during the filling operation. filling, the casing 46 is closed by folding the top end thereof at 106. The fold 106 can be secured by sewing, gluing, stapling or other suitable means. After insertion of the casing 46 in the pressure vessel 12, the casing 46 is pressed, tapped, vibrated or otherwise manipulated to compact the drying composition 44 and the fold 106 is pressed down to form a top wall 108 that is made to be as flat as possible to accommodate the cover plate 20. During insertion and removal of the cartridge 26, the fold 106 can be flipped up and used as a handle to lift the cartridge. Other types of handle (such as one or more straps, strings, tabs, folds, etc.) could also be provided on the cartridge 26 to facilitate lifting.

The length of the cartridge 26 depends on the height of the pressure vessel 12, and is selected so that the top wall 108 of the casing 46 (following compaction of the drying composition 44) terminates above the outlet port 36 and so that a major portion of the top wall engages the rigid, substantially planar bottom surface of the cover plate 20. This will result in the cartridge 26 filling up a substantial portion of the distance between the coalescer assembly 48 and the bottom of the cover plate 20. An excessive air gap between the top wall 108 and the cover plate 20 (e.g., more than approximately 0.125-0.25 inches) is not advisable. Such a gap could result in the cartridge 26 elongating in the lengthwise direction and narrowing in the widthwise direction, and thus losing contact with the interior side walls of the pressure vessel 12, thereby allowing air/gas to channel around the outside of the casing 46. Channeling could also occur within the casing 46 as a result of the drying composition 44 becoming loose and unsettled. Moreover, because the cartridge 26 is not affirmatively connected to any structure within the dryer 10, and simply rests on the coalescer assembly 48 the application of air/gas pressure to the inlet side of the dryer 10 could shift the casing 26 upwardly with great force, possibly rupturing the casing by slamming it into the cover 20.

Figure 8:
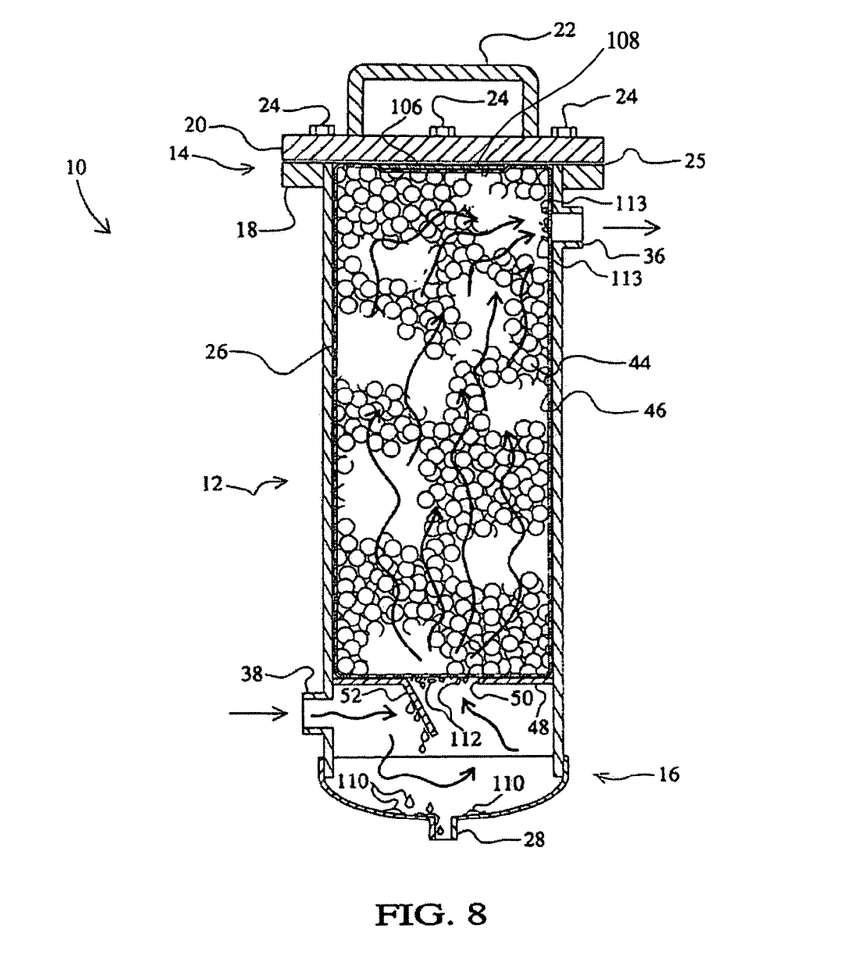
FIG. 8 is an enlarged cross-sectional centerline view showing the dryer of FIGS. 1-3 in order to better illustrate the internal geometry thereof during operation.

FIG. 8 illustrates the flow of compressed air/gas through the dryer 10 during operation. It will be seen that the compressed air/gas enters the lower portion 16 of the pressure vessel 12 via the inlet port 38. A substantial portion of the air/gas flow will impinge on the baffle 52. The baffle 52 will require the air/gas flow to divert around the edges of the baffle before flowing upwardly through the aperture 50 in the coalescer assembly 48. Liquid particulates, such as water droplets, oil droplets or the like, will tend to coalesce on the baffle 52, and condense out of the air/gas stream. These liquid particulates, shown (not to scale) by reference numeral 110 in FIG. 8, will roll off the baffle 52 under the force of gravity into the sump area situated around the drain port 28. The air/gas flow traveling upwardly through the aperture 50 will pass through the bottom wall 104 of the casing 46. As stated above, the porosity of the casing material 46 is selected to provide a filtering function in order to filter dirt, dust, oil residue and other debris out of the air/gas stream. These filtered materials are shown (not to scale) by reference numeral 112 in FIG. 8. As the air/gas flow enters the cartridge 26 it dissipates through the packed drying composition 44, giving up moisture content as the air/gas flow moves upwardly toward the outlet port 36. The latter is situated in adjacent opposition to the tubular portion 102 of the casing 46, proximate to the upper end of the cartridge 26, and below the cover 20. It will be appreciated that this positioning simplifies the construction of the cover 20 insofar as this component does not need to be configured with passages to accommodate air/gas flow, as sometimes seen in other designs. Before emerging from the cartridge 26 at the outlet port 36, the air/gas flow must again pass through the casing material 46, and will thereby be filtered a second time to remove unwanted contaminants 113 (not to scale)

that will mainly comprise very small particles of the drying composition 44 (e.g., desiccant dust). The air/gas flow emerging from the outlet port 36 will thus be moisture treated to provide a very dry air/gas stream for delivery to the point-of-use, and will also be filtered to remove oil, dirt and other contaminants. This filtering will occur at both the inlet and outlet ends of the cartridge 26.

Referring again to FIGS. 1-3, the dryer 10 is situated during operation near a point-of-use wherein its outlet 36 is connected to one end of the outlet line 40 and its inlet is connected to the inlet line 42. If the dryer 10 being used in a paint booth operation, the user would connect the free end of the outlet line 40 to a paint gun and apply paint in conventional fashion. As indicated, depending on the size of the pressure vessel 12, the dryer 10 should be capable of operating over the course of many paint jobs. Thus, it will not usually be necessary to check the dryness indicator 54, except perhaps once at the beginning of each use of the dryer 10. As long as the dryness indicator 54 shows that the cartridge 26 remains functional, the dryer 10 may be used. At some point, however, the dryness indicator 54 will indicate that the drying composition 44 in the cartridge 26 has lost its ability to remove moisture to a desired dryness level. When this occurs, the user can momentarily stop the application, and replace the spent cartridge 26 with a new cartridge before continuing the application.

As shown in FIG. 6, to exchange the disposable cartridge 26, the fasteners 24 are removed so that the cover 20 can be lifted from the mounting flange 18. Because the cartridge 26 is not connected to any structure within the dryer 10, but simply rests on the cartridge support surface provided by the coalescer assembly 48, the cartridge can be quickly pulled out of the pressure vessel 12 and a replacement cartridge slipped in. After checking the resilient member 25 and replacing as necessary, the cover 20 can be remounted and the fasteners 24 reattached. A quick release of the valve 29 (see FIG. 3) can also be performed at this point (and also at the beginning or end of each application session) to drain out liquid particulates. It will be appreciated that the foregoing steps take only moments of time, following which the dryer 10 will be fully restored and ready for many more cycles of operation. There is no need for confusing instructions, no maintenance, no direct handling of the drying composition 44, and no need for skilled or qualified personal. The spent cartridge 26 can either discarded or recycled.

Accordingly, a disposable cartridge air/gas dryer apparatus has been disclosed for effectively delivering dry air or gas to a compressed air/gas application. The disclosed dryer is ideally suited for installation near a point-of-use, is designed to utilize a disposable dryer cartridge that is easy to replace, and does not require messy drying composition handling. The dryer additionally performs integrated filtering and coalescing functions that may obviate the need for external filter and coalescer units.

Figures 9, 9A:
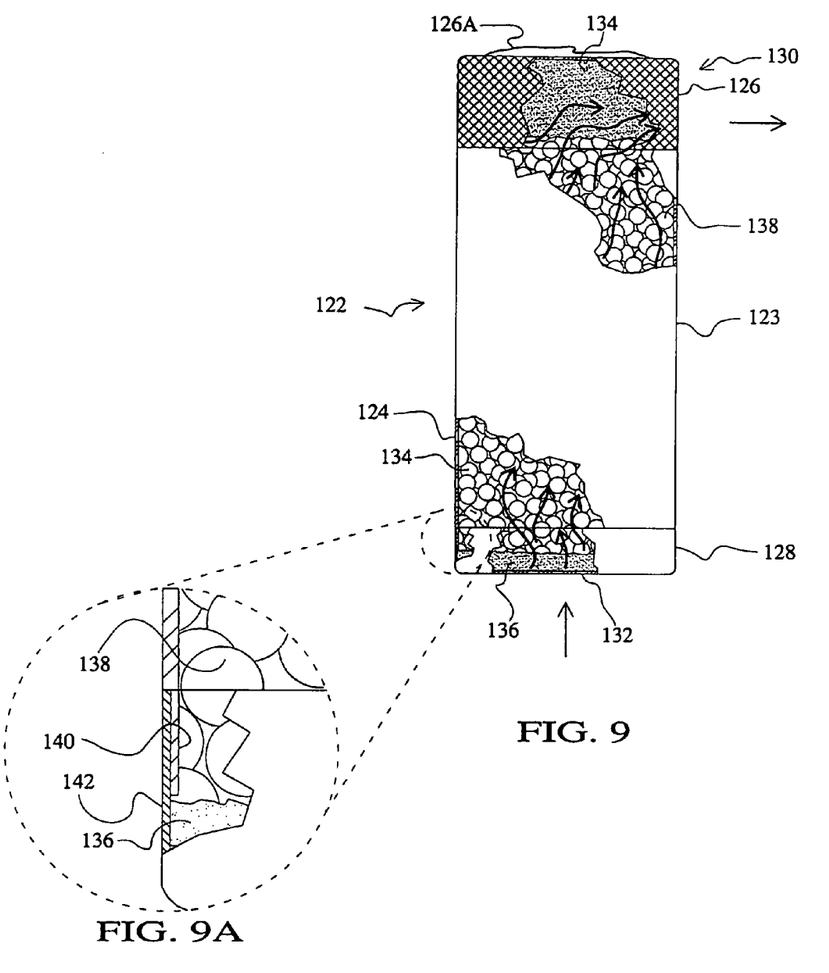
FIG. 9 is a perspective view of an alternative dryer cartridge that may be constructed in accordance with the invention.
FIG. 9A is an enlarged detailed view showing a portion of the alternative dryer cartridge of FIG. 9.

Although various embodiments of the inventive dryer have been disclosed, it should be understood that the description and the drawings herein are merely illustrative, and that various modifications, combinations and changes can be made in accordance with the invention. For example, a disposable dryer cartridge that is not made from a fabric casing could be used in the dryer 10. FIGS. 9 and 9A illustrate such a cartridge 122. The cartridge 122 has a casing 123 formed by tubular wall 124 and a pair of end caps 126 and 128, all of which can be made from rigid plastic (or other) material. Multiple apertures 130 and 132 are respectively formed in the end caps 126 and 128. A pair of filter pads 134 and 136 made from fibrous material or any other suitable filtering medium are respectively disposed on the inside of the end caps 126 and 128. The remainder of the cartridge 122 is substantially packed with a drying composition 138, such as desiccant beads. A handle 126A can be provided on the end cap 126 so that the cartridge 122 can be lifted during insertion and removal in and from the dryer 10.

When the cartridge 122 is used in the dryer 10, compressed air/gas will enter the cartridge through the lower apertures 132. The apertures 132 are formed on the bottom wall of the lower end cap 128 and can be provided in any suitable number, shape and size. The remaining wall portions of the lower end cap 128 are preferably solid so that the air/gas flow is required to pass through the bottom and out the top of the filter pad 136. As the air/gas passes through the lower filter pad 136, unwanted debris, dust, oil residue and other contaminants will be removed. The air/gas flow will then enter the drying composition 138 and dissipate therethrough, giving up its moisture as the air/gas travels upwardly through the cartridge 122 toward the upper end cap 126. Upon leaving the drying composition 138, the air/gas flow passes through the upper filter pad 134, where additional filtering of contaminants, primarily comprising small particles of the drying composition, is performed. The air/gas flow then exits the disposable cartridge 122 via the upper apertures 130. These are shown to be formed in the sidewall of the upper end cap 126, with the top wall of the upper end cap being solid. The apertures 130 preferably extend around the entirely periphery the upper end cap sidewall insofar as this allows the cartridge 122 to be placed in the dryer 10 without regard to its rotational orientation. Alternatively, the apertures 130 could be formed around a portion of the upper end cap 126 sidewall, but this would require that the cartridge 122 be rotated so that the apertures 130 align with the outlet port 36 when the cartridge is inserted in the dryer 10. As shown in FIGS. 9A, the end caps 126 and 128 can be mounted to the casing 123 by reducing the thickness of the tubular wall 124 at each end thereof to provide a pair of reduced thickness wall sections 140. A sidewall portion 142 of each end cap 126/128 is sized to slide over the outside of one of the wall sections 140, and can be affixed thereto using adhesive bonding or other suitable attachment technique.

The construction of FIGS. 9 and 9A is but one example of the various alternative embodiments that can be implemented in accordance with the invention. It will be appreciated, therefore, that the invention is not to be in any way limited except in accordance with the spirit of the appended claims and their equivalents.

What is claimed is:

1. A disposable cartridge air/gas dryer apparatus for installation in an air/gas line delivering compressed air/gas to an air/gas-driven tool, comprising:
    a pressure vessel having a peripheral wall member defining an interior space within said pressure vessel;
    an inlet port disposed upon said pressure vessel;
    an outlet port disposed upon said pressure vessel;
    a disposable dryer cartridge disposed within said pressure vessel and comprising a casing having a quantity of a drying composition disposed within said casing;
    a handle disposed upon on said cartridge for lowering and lifting said cartridge during insertion and removal of said cartridge into and out from said pressure vessel;
    a cartridge support surface disposed within said pressure vessel for supporting a first lower end portion of said cartridge;

a cartridge receiving opening defined within an upper end portion of said pressure vessel for permitting said cartridge to be inserted into and removed from said pressure vessel; and a cover member removably disposed upon said pressure vessel so as to cover said cartridge receiving opening defined within said upper end portion of said pressure vessel, and engaged with a second upper end portion of said cartridge when said cartridge is disposed within said pressure vessel such that said cartridge substantially fills that portion of said interior space of said pressure vessel which is defined between an interior surface portion of said peripheral wall member, said cartridge support surface, and said cover member.

2. An apparatus according to claim 1, wherein:
said inlet port and said outlet port are respectively situated proximate to first and second ends of said cartridge.

3. An apparatus according to claim 1, wherein:
said cartridge comprises a sack-like casing made from a fabric that performs a filtering function.

4. An apparatus according to claim 1, wherein:
said cartridge comprises a rigid casing having apertured end caps and filter media disposed in each end cap.

5. An apparatus according to claim 1, wherein:
said handle is situated at said second end portion of said cartridge adjacent to said cover member.

6. An apparatus according to claim 1, wherein:
said cartridge support surface comprises a coalescer assembly that includes a plate on which said cartridge rests, an aperture in said plate to allow air/gas flow into said cartridge, and a coalescing baffle extending from said plate into an air/gas flow path to capture liquid particulates.

7. An apparatus according to claim 6, wherein:
said pressure vessel comprises a sump area below said coalescer assembly for trapping liquid particulates received from said baffle and a drain port for draining said sump area.

8. An apparatus according to claim 7, wherein:
said inlet port is disposed below said coalescer assembly and above said sump area; and
said outlet port is disposed in adjacent position to a side portion of said cartridge proximate to said second end portion of said cartridge.

9. An apparatus according to claim 1, further including:
one of a floor stand or a wall mount on said pressure vessel.

10. An apparatus according to claim 1, further including:
a dryness indicator on said pressure vessel proximate to said outlet port.

11. A disposable cartridge air/gas dry apparatus for installation in an air/gas line delivering compressed air/gas to an air/gas-driven tool, comprising:
a pressure vessel having a peripheral wall member defining an interior space within said pressure vessel;
a disposable dryer cartridge disposed within said pressure vessel and comprising a casing having a quantity of a drying composition disposed within said casing;
an inlet port disposed upon said pressure vessel so as to be disposed adjacent to a first upper end portion of said cartridge;
an outlet port disposed upon said pressure vessel so as to be disposed adjacent to a second lower end portion of said cartridge;
a cartridge support surface disposed within said pressure vessel for supporting said first lower end portion of said cartridge;

a cartridge receiving opening defined within an upper end portion of said pressure vessel for permitting said cartridge to be inserted into and removed from said pressure vessel; and a cover member removably disposed upon said pressure vessel so as to cover said cartridge receiving opening defined within said upper end portion of said pressure vessel, wherein said cover member is engaged with said second upper end portion of said cartridge when said cartridge is disposed within said pressure vessel such that said cartridge substantially fills that portion of said interior space of said pressure vessel which is defined between an interior surface portion of said peripheral wall member, said cartridge support surface, and said cover member, and wherein said cover member is free of air/gas passages such that said compressed air/gas, being conducted into said cartridge through said inlet port, must traverse said cartridge and be conducted out from said cartridge through said outlet port.

12. An apparatus according to claim 11, wherein:
said pressure vessel is a welded structure comprising a tubular shell member, an upper flange casting, and a lower sump casting.

13. An apparatus according to claim 12, wherein:
said outlet port is formed in said upper flange casting.

14. An apparatus according to claim 13, wherein:
said upper flange casting further includes an aperture mounting a dryness indicator fitting.

15. An apparatus according to claim 14, wherein:
said inlet port is formed in said lower sump casting.

16. An apparatus according to claim 15, wherein:
said lower sump casting further includes a drain port mounting a valve.

17. An apparatus according to claim 16, wherein:
said cartridge support surface comprises a coalescer assembly that includes a cartridge support plate welded to said tubular shell member, an aperture in said plate to allow air/gas flow into a dryer cartridge when inserted in said dryer, and a coalescing baffle extending from said plate into an air/gas flow path to capture liquid particulates.

18. An apparatus according to claim 17, wherein:
said cover plate comprises a handle for carrying said dryer.

19. An apparatus according to claim 11, further including:
one of a floor stand or a wall mount on said pressure vessel.

20. A disposable cartridge air/gas dry apparatus for installation in an air/gas line delivering compressed air or gas to an air/gas-driven tool, comprising:
a pressure vessel;
an inlet port on said pressure vessel;
an outlet port on said pressure vessel;
a disposable dryer cartridge in said pressure vessel;
said cartridge comprising a flexible sack-like casing made from a fabric that performs a filtering function and a quantity of a compactable drying composition in said casing;
a rigid, substantially planar cartridge support surface in said pressure vessel, said cartridge support surface adapted to engage a major portion of a first end of said cartridge;
a cartridge receiving opening in said pressure vessel for inserting and removing said cartridge in and from said pressure vessel;

a cover removably covering said opening and capturing a second end of said cartridge; and said cover having a rigid, substantially planar inner surface adapted to engage a major portion of a second end of said cartridge; and said dryer being sized so that said side portions of said casing substantially engage an interior wall portion of said pressure vessel and so that said cartridge support surface and said cover inner surface are spaced by a distance that substantially corresponds to a length of said casing between said first and second ends thereof when said drying composition is compacted.

* * * * *